(12) United States Patent
Park

(10) Patent No.: US 8,009,199 B2
(45) Date of Patent: Aug. 30, 2011

(54) COMPOSITE PHOTOGRAPHING METHOD AND MOBILE TERMINAL USING THE SAME

(75) Inventor: Dong Joon Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 760 days.

(21) Appl. No.: 11/972,152

(22) Filed: Jan. 10, 2008

(65) Prior Publication Data

US 2008/0266414 A1  Oct. 30, 2008

(30) Foreign Application Priority Data

Apr. 30, 2007  (KR) .................. 10-2007-0042158

(51) Int. Cl.
  *H04N 7/14* (2006.01)
  *H04N 5/232* (2006.01)
(52) U.S. Cl. ................. 348/211.13; 340/14.03
(58) Field of Classification Search ............ 345/1.1, 345/161, 520, 156; 348/14.03, 211.13, 211.99; 715/702
See application file for complete search history.

(56) References Cited

U.S. PATENT DOCUMENTS

| | | | |
|---|---|---|---|
| 2004/0085447 A1* | 5/2004 | Katta et al. | 348/143 |
| 2007/0014551 A1* | 1/2007 | Fujisawa et al. | 396/20 |
| 2007/0018069 A1* | 1/2007 | Higashino | 250/200 |
| 2007/0076861 A1* | 4/2007 | Ju | 379/433.01 |
| 2007/0222859 A1* | 9/2007 | Chang et al. | 348/148 |
| 2008/0018610 A1* | 1/2008 | Harmon et al. | 345/173 |

FOREIGN PATENT DOCUMENTS

| | | |
|---|---|---|
| KR | 1020030057473 | 7/2003 |
| KR | 1020050116699 | 12/2005 |

* cited by examiner

*Primary Examiner* — Lin Ye
*Assistant Examiner* — Euel Cowan
(74) *Attorney, Agent, or Firm* — H.C. Park & Associates, PLC

(57) ABSTRACT

A composite photographing method and mobile terminal using the same are disclosed. The composite photographing method includes receiving a composite shooting request, demarcating a target scene into individual shooting areas on the basis of a touch event signal from a touch screen;, and photographing the individual shooting areas to produce a single composite photograph.

16 Claims, 7 Drawing Sheets

COMPOSITE PHOTOGRAPHING METHOD AND MOBILE TERMINAL USING THE SAME

CROSS REFERENCE TO RELATED APPLICATION

This application claims priority from and the benefit of Korean Patent Application No. 10-2007-0042158, filed on Apr. 30, 2007, which is hereby incorporated by reference for all purposes as if fully set forth herein.

BACKGROUND OF THE INVENTION

1. Field of the Invention

The present invention relates generally to a mobile terminal capable of producing composite photographs and, more particularly, to a composite photographing method and a mobile terminal using the same, wherein the user may freely demarcate a target scene into shooting areas to be individually photographed to produce a composite photograph.

2. Discussion of the Background

In general, a mobile terminal refers to a terminal that can be readily carried by a person and can perform various functions implemented by wireless communication and application programs. A personal mobile communication services terminal, a personal digital assistant (PDA), a smart phone, an international mobile communications 2000 (IMT-2000) terminal, and a wireless local area network (WLAN) terminal are examples of a mobile terminal.

With advances in technologies, mobile terminals have become miniaturized and lightweight, and have now evolved into multifunction convergence terminals that perform various functions related to MP3 audio, digital photographing, and navigation.

A camera-equipped mobile terminal may enable a user to produce a composite photograph. In composite photographing, two or more photographs taken in series are merged together into a single composite photograph. For example, the user evenly demarcates a target scene into multiple shooting areas using a preset menu, and photographs the individual shooting areas in succession. For example, if there are nine shooting areas, nine photographs are taken. After all of the photographs are taken, the photographs are merged together to form a single composite photograph.

However, in conventional composite photographing, demarcation patterns of target scenes may be predefined and very difficult to change. The user may only be able to select one of existing demarcation patterns, and may have no choice but to use the selected demarcation pattern to produce a composite photograph. That is, the user may not be able to obtain a composite photograph having a desired composition in terms of shape, size, and position.

SUMMARY OF THE INVENTION

The present invention provides a composite photographing method and a mobile terminal using the same, wherein a target scene may be demarcated into shooting areas according to user preferences to produce various types of composite photographs.

Additional features of the invention will be set forth in the description which follows, and in part will be apparent from the description, or may be learned by practice of the invention.

The present invention discloses a composite photographing method using a touch screen, including receiving a composite shooting request, demarcating a target scene into individual shooting areas in response to a touch event signal from the touch screen, and photographing the individual shooting areas.

The present invention also discloses a mobile terminal having a touch screen, including a shooting area setter to demarcate a target scene into individual shooting areas in response to a touch event signal from the touch screen; and a composite shooting section to take photographs of the individual shooting areas in response to a shooting request.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
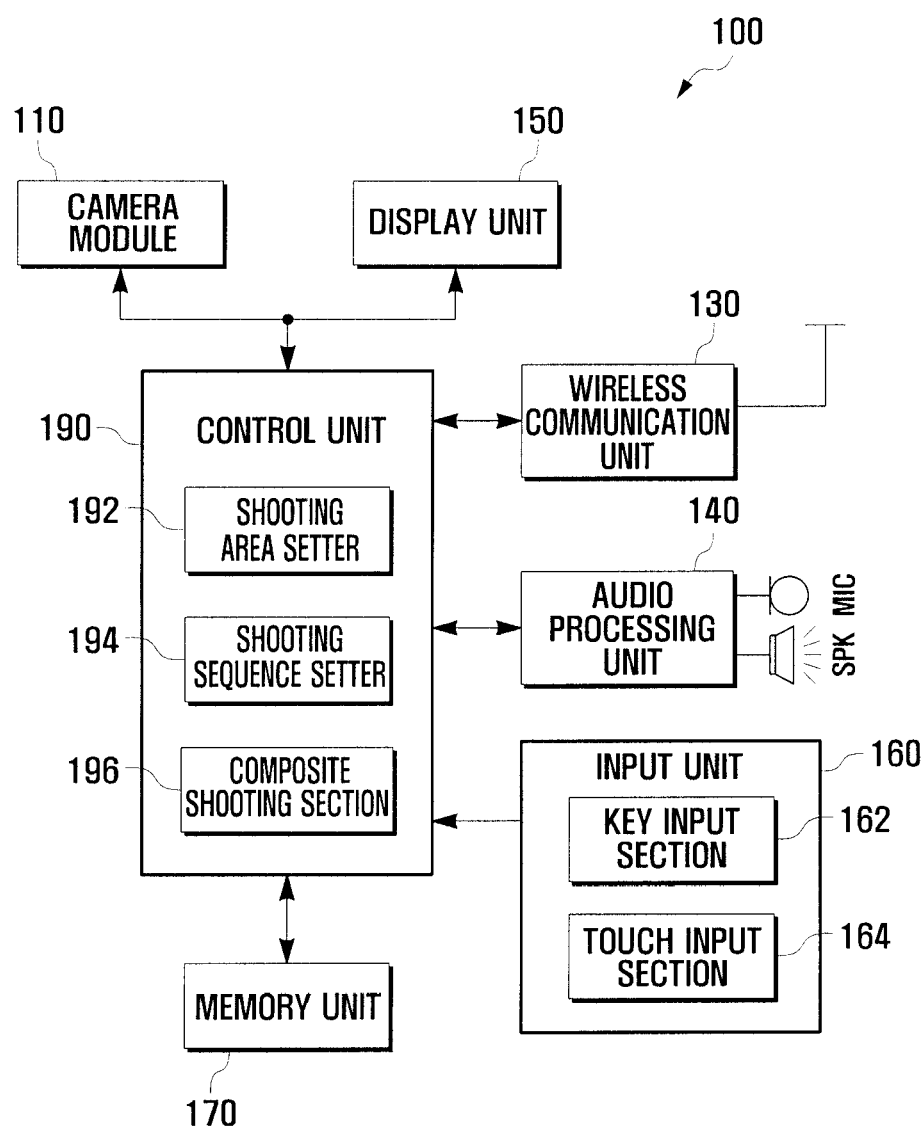
FIG. 1 is a block diagram showing a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

For the purpose of description, a camera-equipped mobile terminal enabling composite photographing is described as an example of a mobile terminal of the present invention; however the present invention is not limited thereto. The mobile terminal of the present invention is a terminal for user convenience, and may be any information and communication appliance or multimedia appliance, such as a mobile communication terminal, a mobile phone, a digital multimedia broadcasting (DMB) receiver, a digital video broadcasting (DVB-handheld) receiver, a wired/wireless phone, a personal digital assistant (PDA), a smart phone, a notebook, a personal computer, an international mobile telecommunications 2000 (IMT 2000) terminal, a wideband code division multiple access (WCDMA) terminal, a universal mobile telecommunications system (UMTS) terminal, or a global system for mobile communications (GSM)/general packet radio services (GPRS) terminal.

In the description, a touch screen refers to a display unit having a touch input section such as a touch panel. Thus, a signal input through the touch input section corresponds to an occurrence of a touch event caused by a physical force applied to the touch input section.

Referring to FIG. 1, the mobile terminal 100 includes a camera module 110, a wireless communication unit 130, an audio processing unit 140, an input unit 160, a display unit 150, a memory unit 170, and a control unit 190.

The camera module 110 produces a preview image to be photographed. The camera module 110 includes a lens (not shown) to form an image, an image sensor (not shown) to convert an optical signal corresponding to the formed image into an electrical signal, and a signal processor (not shown) to convert the analog electrical signal from the image sensor into digital data. The image sensor may be a charge-coupled device (CCD) sensor, and the signal processor may be a digital signal processor (DSP).

The camera module 110 also includes a video processing unit (not shown). The video processing unit processes an image signal from the camera module 110 in units of frames, and outputs video data according to display characteristics and the size of the display unit 150. The video processing unit compresses video data and sends the compressed video data to the control unit 190. The video processing unit includes a video coder/decoder (video codec) to compress video data to be displayed on the display unit 150 in a preset format, and to decompress compressed video data. The video codec may be a codec based on a joint photographic experts group (JPEG) specification, a moving picture experts group (MPEG) 2 specification, an MPEG 4 specification, a wavelet specification, an H.263 specification, or an H.264 specification.

The wireless communication unit 130 sends and receives data for wireless communication of the mobile terminal 100. The wireless communication unit 130 may include a radio frequency (RF) transmitter to upconvert the frequency of a signal to be transmitted and amplify the signal, and an RF receiver to low-noise amplify a received signal and downconvert the frequency of the signal. The wireless communication unit 130 may receive data through a wireless channel and output the received data to the control unit 190, and may transmit data from the control unit 190 through the wireless channel.

The audio processing unit 140 may include a codec. The codec may have a data codec to process packet data and the like, and an audio codec to process an audio signal such as a voice signal. In call processing, the audio processing unit 140 converts a digital audio signal from the control unit 190 into an analog signal through the audio codec to reproduce the analog signal through a speaker SPK, and converts an analog audio signal from a microphone MIC into a digital audio signal through the audio codec to provide the digital audio signal to the control unit 190.

The display unit 150 displays various menus and function settings of the mobile terminal 100, as well as information input by the user. The display unit 150 may include a panel of liquid crystal display (LCD) devices, an LCD controller to control LCD devices, and a video memory to store video data. The panel may have a touch screen capability. If the panel has a touch screen capability, the display unit 150 may also act as an input device.

In particular, the display unit 150 includes an LCD panel and a backlight. The LCD panel includes liquid crystal cells injected between two glass substrates, and adjusts the light transmittance of the liquid crystal cells to display images. The amount of light passing through a liquid crystal cell is adjusted according to a corresponding video or pixel signal. The backlight emits light toward the LCD panel, and the user can view visual images formed using the light passing through the LCD panel.

The input unit 160 receives a manipulation signal from the user to control the mobile terminal 100, and sends the manipulation signal to the control unit 190. In particular, the input unit 160 includes a key input section 162 to receive a manipulation signal through keys, and a touch input section 164 attached to the LCD panel of the display unit 150.

The key input section 162 may include a plurality of control keys (not shown) to control operations of the mobile terminal 100, and a plurality of alphanumeric keys (not shown) to input numerals and characters.

The touch input section 164 creates an input signal through generation of a voltage or current signal corresponding to a location at which a touch event occurs, and sends the input signal to the control unit 190.

The touch input section 164 may be implemented by a touch panel. When the touch input section 164 is a touch panel, it may include an upper substrate and a lower substrate, each of which is coated with an indium-tin-oxide (ITO) film having an ITO electrode membrane or with poly-ethylene terephthalate (PET) film having an ITO electrode membrane, electrode patterns arranged on the ITO electrode membranes, and spacers to maintain a constant gap between the upper substrate and lower substrate.

A conductive x-axis pattern and y-axis pattern, spaced apart from each other by an insulator, are arranged at edges of the ITO electrode membrane. When a finger or the like touches the upper substrate, the ITO electrode membrane of the upper substrate contacts that of the lower substrate. Then, a voltage is measured from the x-axis pattern and y-axis pattern, and the coordinates of the touched location are extracted and sent to the control unit 190.

The memory unit 170 stores application programs to perform functions related to exemplary embodiments of the present invention, downloaded contents, and data created by the user. The memory unit 170 may include a program storage section and a data storage section.

The program storage section of the memory unit 170 stores an operating system to boot the mobile terminal 100, and application programs for supplementary functions related to playback of audio data including songs and video data including still and moving images. When one of these functions is activated in response to a user request, the mobile terminal 100 executes a corresponding application program under the control of the control unit 190. The memory unit 170 can provide a buffer space to temporarily store user data (such as songs, still images and moving images) generated from execution of application programs.

The data storage section stores user data, such as music files and moving image files, generated from the use of the mobile terminal 100.

The control unit 190 controls the overall operation of the mobile terminal 100 and signal exchange between internal components thereof. That is, the control unit 190 controls signal exchange between the camera module 110, the wireless communication unit 130, the audio processing unit 140, the display unit 150, the input unit 160, and the memory unit 170.

The control unit 190 executes a requested function of the mobile terminal 100 according to an input signal from the input unit 160 (for example, a key input signal or a touch event caused by a touch to the touch input section 164), and controls the display unit 150 to display the current state of the function in execution and information to be provided to the user, such as a menu.

The touch input control of the control unit 190 is described in brief. The control unit 190 may perform an operation on the basis of the coordinates and time duration of a touch event. That is, in response to a touch action by the user, the touch input section 164 senses a voltage or current signal corresponding to the touch event, extracts the coordinates (including trajectory) of the touched location and measures the time duration of the touch action, and sends the coordinates and time duration to the control unit 190. Then, the control unit 190 performs a preset operation on the basis of the coordinates and the time duration of the touch event. A touch event may correspond to a long key press, a short key press, or a drag.

Further, the control unit 190 produces a composite photograph of the target scene demarcated according to user preferences. Thereto, the control unit 190 includes a shooting area setter 192, a shooting sequence setter 194, and a composite shooting section 196.

The shooting area setter 192 demarcates a target scene displayed on the display unit 150 into shooting areas to be individually photographed according to signals from the touch input section 164. That is, in response to a composite shooting request, the shooting area setter 192 receives a demarcation signal from the touch input section 164, demarcates the target scene into shooting areas on the basis of the demarcation signal, and draws lines of demarcation between the shooting areas on the screen.

The shooting sequence setter 194 assigns a composite shooting sequence to the shooting areas set by the shooting area setter 192, and sends the composite shooting sequence to the composite shooting section 196.

The composite shooting section 196 sequentially photographs the shooting areas according to the composite shooting sequence from the shooting sequence setter 194, and combines the photographs into a single composite photograph.

The configuration of the mobile terminal 100 according to an exemplary embodiment of the present invention is described above. A composite photographing method of an exemplary embodiment of the present invention is described below.

Figure 2:
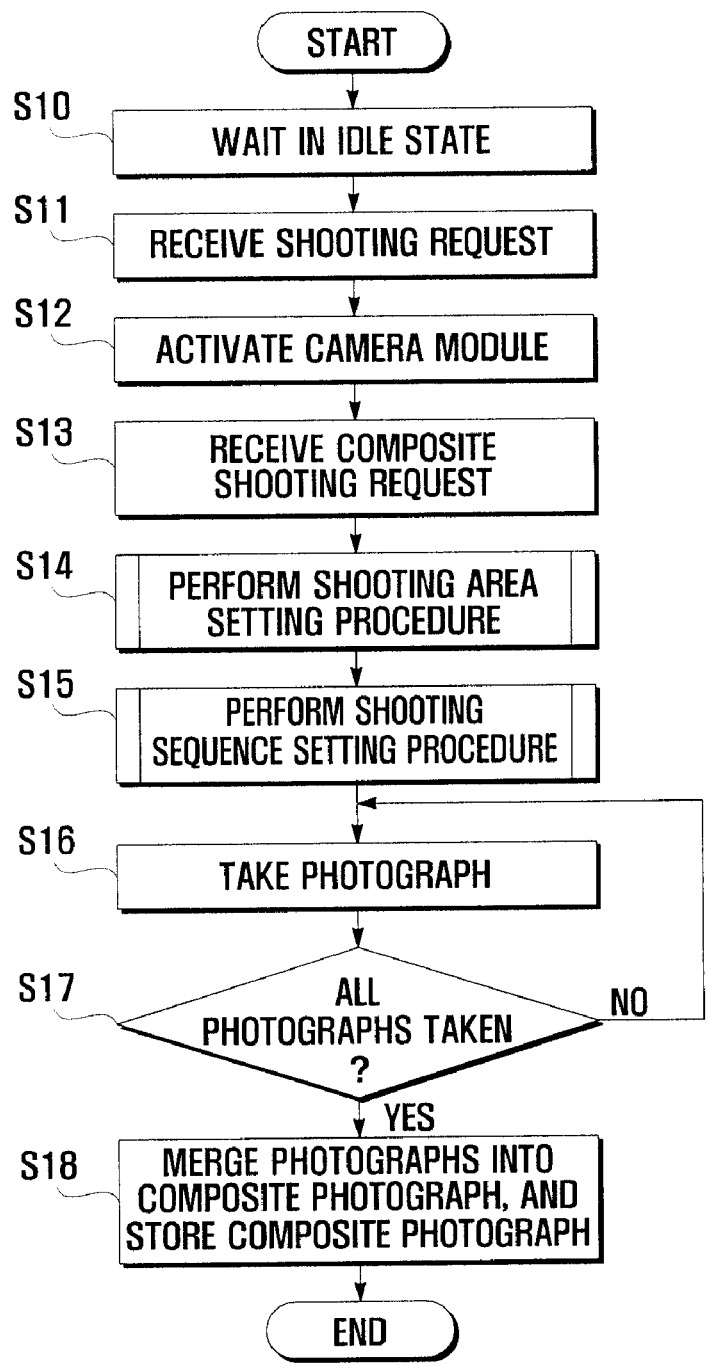
FIG. 2 is a flow chart showing a composite photographing method according to another exemplary embodiment of the present invention.

Referring to FIG. 2, upon power-on, the mobile terminal 100 enters an idle state (S10) and displays an idle screen on the display unit 150.

When the user issues a shooting request through the input unit 160, the control unit 190 receives a corresponding signal from the input unit 160 (S11), and activates the camera module 110 (S12). With activation of the camera module 110, the mobile terminal 100 enters a photographing mode, in which the mobile terminal 100 may take a photograph according to a shooting command from the user.

When the control unit 190 receives a composite shooting request from the user (S13), the shooting area setter 192 of the control unit 190 performs a shooting area setting procedure (FIG. 3) (S14).

Figure 3:
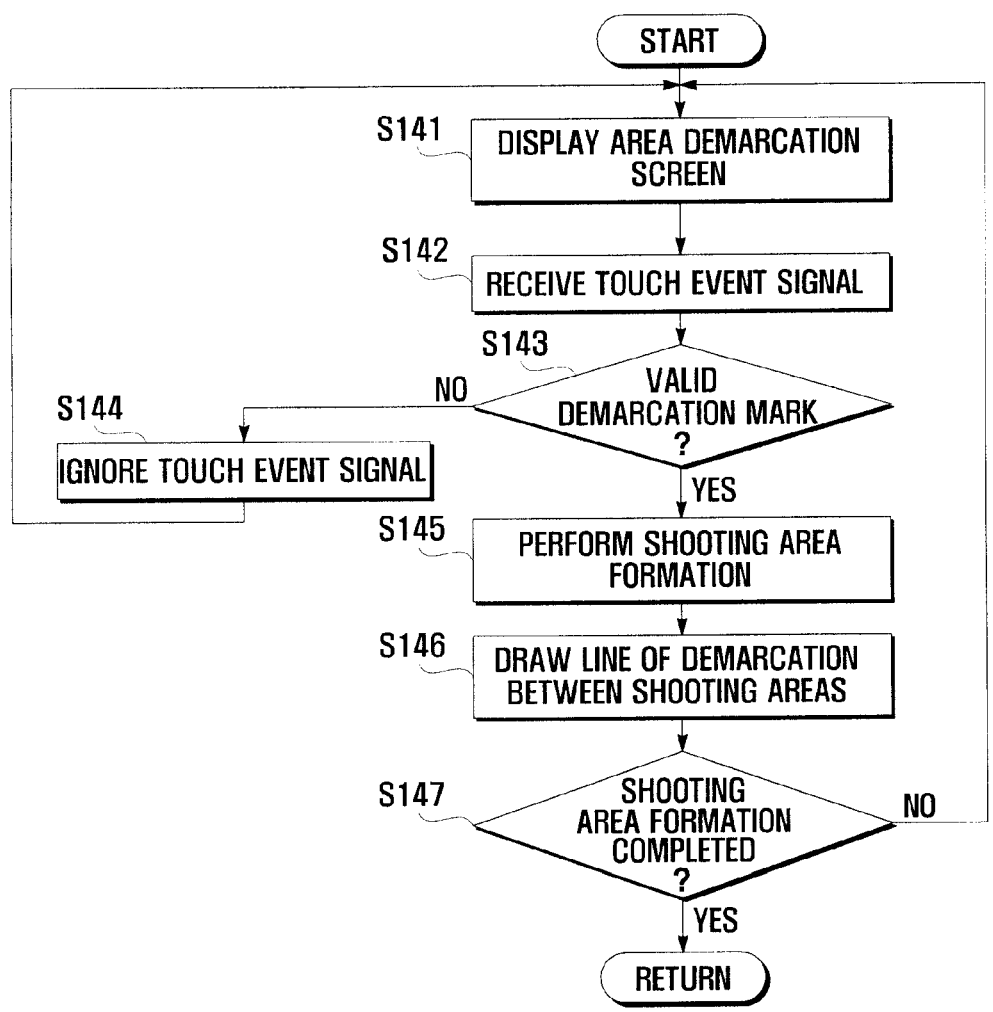
FIG. 3 is a flow chart showing a shooting area setting procedure of the method of FIG. 2.
Figure 5A:
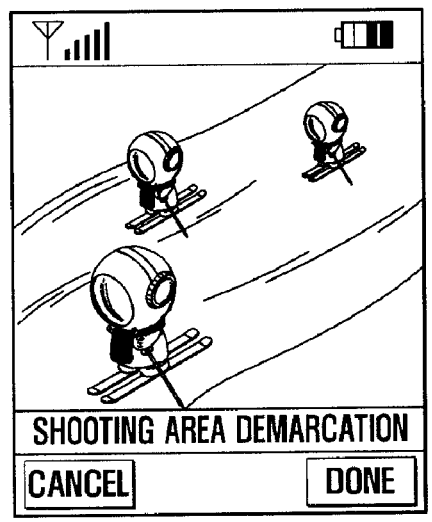
FIG. 5A, FIG. 5B, FIG. 5C, FIG. 5D, FIG. 5E, and FIG. 5F are screen representations showing a shooting area setting process.

Referring to FIG. 3, the shooting area setter 192 displays a shooting area demarcation screen on the display unit 150 (S141). The shooting area demarcation screen may be an empty screen without an image, or a preview image screen displaying an image of a target scene from the camera module 110 as shown in FIG. 5A.

The user can demarcate the target scene into shooting areas of desired shapes using the touch input section 164.

That is, the shooting area setter 192 receives a touch event signal from the touch input section 164 (S142), and checks whether the received touch event signal denotes a valid demarcation mark (S143). A valid demarcation mark, such as a line C in FIG. 5B, contributes to formation of a shooting area. A touch event signal denoting a valid demarcation mark may be input in the form of a continuous straight line, a curved line, or a geometric shape. It may be difficult to use a series of discrete dots to form a shooting area. Hence, in the description, only a continuous line or geometric shape contributing to shooting area formation is regarded as a valid demarcation mark.

If the received touch event signal does not denote a valid demarcation mark, the shooting area setter 192 ignores the received touch event signal (S144), and returns to step S141 for a new input signal.

If the received touch event signal denotes a valid demarcation mark, the shooting area setter 192 performs shooting area formation using the demarcation mark (S145).

Figure 5B:
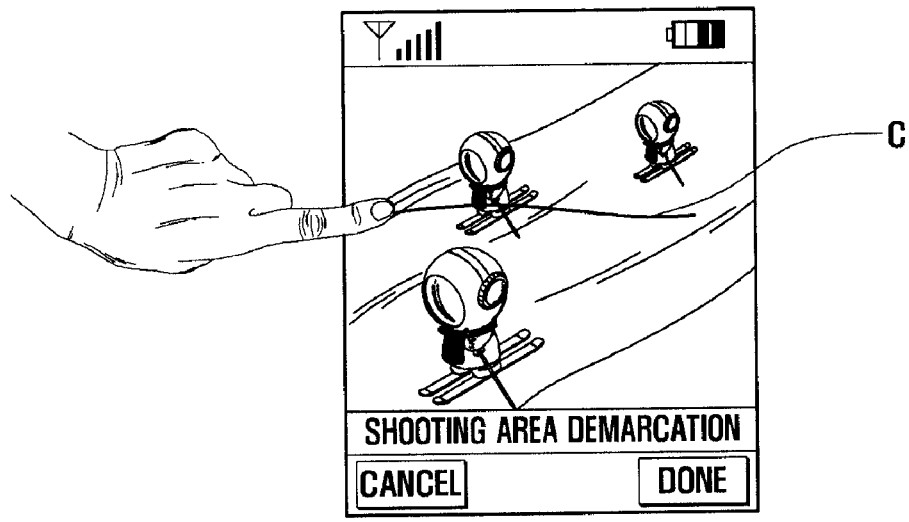

For example, the demarcation mark C in FIG. 5B corresponds to a touch event signal which is long in a horizontal direction. The shooting area setter 192 regards the touch event signal as a valid demarcation mark contributing to shooting area formation.

When the user inputs a touch event signal for shooting area formation, the two ends of a corresponding demarcation mark tend to be spaced apart from the border of the screen as shown in FIG. 5B. Formation of a clean shooting area through the touch input section 164 is not easy. Hence, in the present exemplary embodiment, when a demarcation mark like the line C in FIG. 5B is formed, the shooting area setter 192 extends the two ends of the demarcation mark to the border of the screen, and sets a shooting area on the basis of the extended demarcation mark.

Figure 5C:
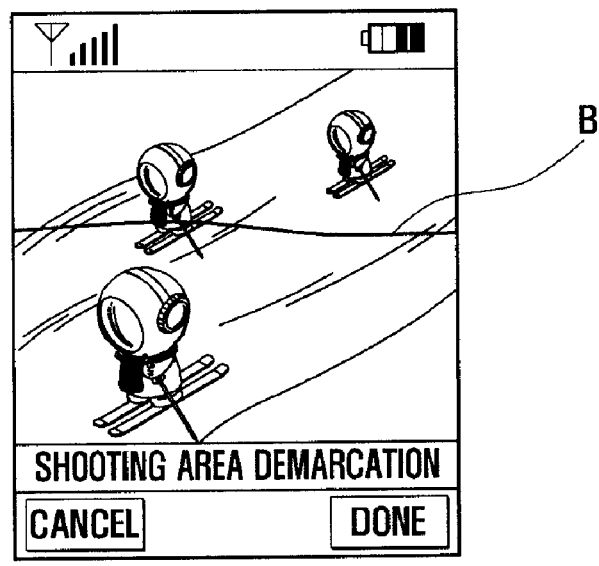

After setting a shooting area, the shooting area setter 192 draws a demarcation line on the screen, as shown by line B in FIG. 5C (S146).

The shooting area setter 192 checks whether the shooting area formation has been completed (S147). If the shooting area formation is not completed, the shooting area setter 192 returns to step S141 to continue shooting area formation. At step S141, the shooting area demarcation screen shows the demarcation line drawn at step S146.

If a shooting area completion request is received, the shooting area setter 192 stores the current shooting area setting data and proceeds to step S15 (FIG. 2).

As described above, the procedure of shooting area formation (namely, steps S141 to S147) is repeated until the user issues a shooting area completion request. Hence, the user may set a desired number of shooting areas.

Although not described, the composite photographing method of exemplary embodiments of the present invention may include a procedure of shooting area deletion.

Figure 4:
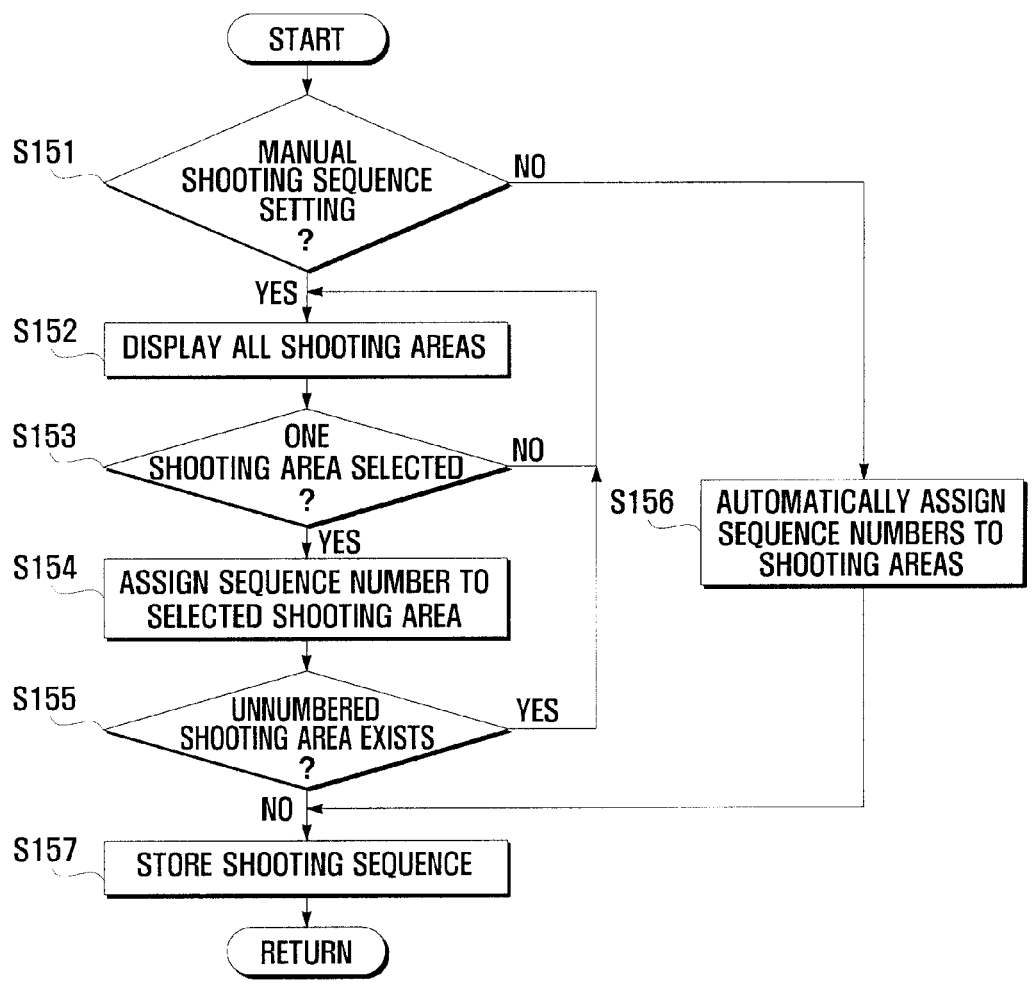
FIG. 4 is a flow chart showing a shooting sequence setting procedure of the method of FIG. 2.
Figure 5D:
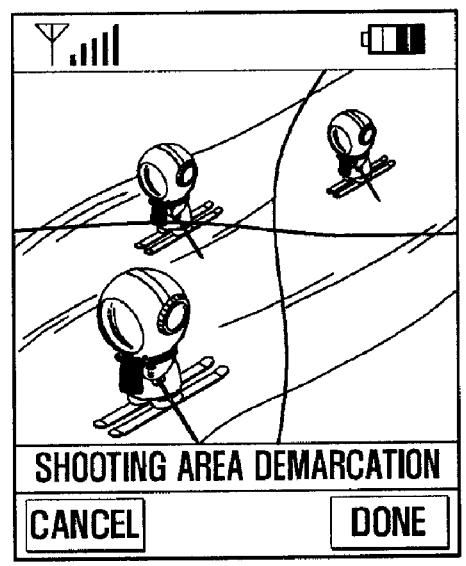

FIG. 5D shows an example of shooting area formation, in which four shooting areas are set by inputting an additional touch event signal in the state of FIG. 5C. When the user issues a shooting area completion request after the shooting area formation, the shooting sequence setting procedure (step S15 in FIG. 2, and FIG. 4) is performed by the shooting sequence setter 194.

Figure 5E:
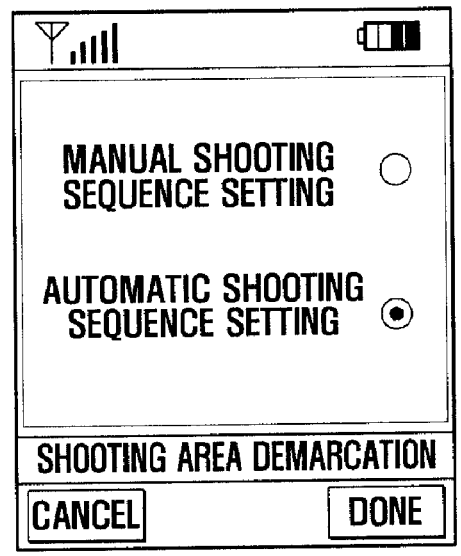

Referring to FIG. 4, the shooting sequence setter 194 displays a manual/automatic selection screen, as shown in FIG. 5E, to request the user to select one of 'manual shooting sequence setting' and 'automatic shooting sequence setting' (S151). In the 'manual shooting sequence setting' option, the user directly assigns sequence numbers to shooting areas. In the 'automatic shooting sequence setting' option, the mobile terminal 100 takes photographs of shooting areas according to a preset shooting sequence.

If the user selects the 'automatic shooting sequence setting' option, the shooting sequence setter 194 assigns sequence numbers to shooting areas in a preset manner (S156), stores the assigned shooting sequence (S157), and ends the shooting sequence setting procedure.

If the user selects the 'manual shooting sequence setting' option, the shooting sequence setter 194 displays currently set shooting areas (S152), and checks whether one of the shooting areas is selected by the user through, for example, a touch event (S153).

If a shooting area is selected, the shooting sequence setter 194 assigns a shooting sequence number to the selected shooting area (S154). Shooting sequence numbers are assigned in order of shooting area selection. For example, in FIG. 5F, two of the four shooting areas are selected in order and assigned their shooting sequence numbers, which indicates that the left upper shooting area is selected first and the right lower shooting area is selected second.

Figure 5F:
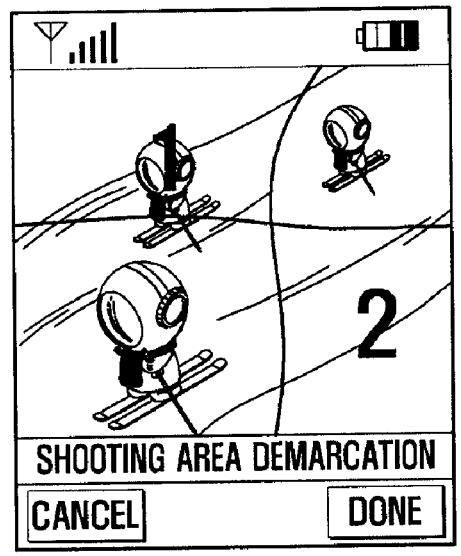

The shooting sequence setter 194 checks whether an unnumbered shooting area is present (S155). If an unnumbered shooting area is present, the shooting sequence setter 194 returns to step S152 to continue shooting sequence setting. In FIG. 5F, the left lower and right upper shooting areas are not numbered.

As described above, in the shooting sequence setting procedure, shooting areas are displayed on the screen and assigned shooting sequence numbers in order of selection.

If all the shooting areas are numbered, the shooting sequence setter 194 stores the assigned shooting sequence (S157), and ends the shooting sequence setting procedure.

A different procedure of shooting sequence setting may be used. For example, the user may directly assign a shooting sequence number to a selected shooting area. When the user selects a shooting area, the shooting sequence setter 194 displays an input box, in which the user then inputs a desired shooting sequence number.

After completion of shooting area setting and shooting sequence setting, photographs of the shooting areas may be taken.

Referring back to FIG. 2, when the user issues a shooting command through the input unit 160, the composite shooting section 196 takes photographs of the shooting areas according to the shooting sequence set at step S15 (S16). The composite shooting section 196 temporarily stores the photographs of the shooting areas. The photographs of the shooting areas may be taken one at a time in a single-shot mode or several at a time in a continuous-shot mode.

Although not described, the composite photographing method may further include removing one of the photographs that is taken. For example, the user may select one of the shooting areas and delete the photograph of the selected shooting area.

The composite shooting section 196 checks whether all of the shooting areas are photographed (S17). The composite shooting section 196 repeats steps S16 and S17 until all of the shooting areas are photographed.

After all of the shooting areas are photographed, the composite shooting section 196 edits and merges the individual photographs of the shooting areas to produce a single composite photograph, and stores the composite photograph in the memory unit 170 (S18).

As apparent from the above description, exemplary embodiments of the present invention provide a composite photographing method and mobile terminal using the same, wherein the target scene is demarcated into shooting areas on the basis of touch event signals from the user and the individual shooting areas are photographed. As a result, shooting areas may be set according to user preferences, and various types of composite photographs may be easily obtained.

Although the target scene is demarcated into shooting areas using a touch screen of the touch screen-enabled mobile terminal in the above description, demarcation of the target scene into shooting areas may also be performed using an input unit such as a touch pad or a pointing device other than a touch screen. In addition, the composite photographing method of exemplary embodiments of the present invention may be applied to a mobile terminal. However, the method may also be applied to any electronic appliance, other than a mobile terminal, having a touch screen and camera module for composite photographing.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A composite photographing method using a touch screen, comprising:
   receiving a composite shooting request;
   demarcating a target scene displayed on the touch screen into individual shooting areas on the basis of a touch event signal from the touch screen, the demarcated individual shooting areas being displayed on the touch screen together;
   setting a shooting sequence of the shooting areas after scene demarcation; and
   photographing the individual shooting areas,
   wherein setting the shooting sequence of the shooting areas comprises displaying the shooting areas and assigning shooting sequence numbers to the shooting areas in order of shooting area selection through the touch screen.

2. A mobile terminal having a touch screen, comprising:
   a shooting area setter configured to demarcate a target scene displayed on the touch screen into individual shooting areas according to a touch event signal from the touch screen, the demarcated individual shooting areas being displayed on the touch screen together;
   a shooting sequence setter to set a shooting sequence of the shooting areas; and
   a composite shooting section configured to take photographs of the individual shooting areas in response to a shooting request,
   wherein the shooting sequence setter displays the shooting areas and assigns shooting sequence numbers to the shooting areas in order of shooting area selection through the touch screen.

3. A composite photographing method, comprising:
   receiving a composite shooting request;
   displaying a target scene in response to the composite shooting request;
   receiving a touch event signal from a touch screen;
   determining whether the touch event signal is a valid demarcation signal;
   demarcating the target scene into individual shooting areas on the basis of the valid demarcation signal, the demarcated individual shooting areas being displayed together;
   setting a sequence for photographing the individual shooting areas; and
   photographing the individual shooting areas according to the sequence,
   wherein setting the sequence for photographing the individual shooting areas comprises:

displaying the demarcated target scene; and sequentially assigning sequence numbers to sequentially selected individual shooting areas, the individual shooting areas being sequentially selected according to user input.

4. The composite photographing method of claim 1, wherein demarcating a target scene comprises:

receiving a demarcation signal from the touch screen in response to the composite shooting request; and demarcating the target scene on the basis of the received demarcation signal.

5. The composite photographing method of claim 4, wherein receiving a demarcation signal comprises checking whether a touch event signal from the touch screen contributes to shooting area formation.

6. The composite photographing method of claim 5, wherein the demarcation signal is a line or a geometrical figure.

7. The composite photographing method of claim 5, wherein demarcating a target scene comprises drawing a line of demarcation between the shooting areas using the checked demarcation signal.

8. The composite photographing method of claim 7, wherein demarcating the target scene is repeated until a shooting area completion request is received.

9. The composite photographing method of claim 4, wherein the shooting sequence is set on the basis of an arrangement order of the shooting areas.

10. The composite photographing method of claim 4, wherein photographing the individual shooting areas comprises sequentially photographing images of the shooting areas.

11. The composite photographing method of claim 10, further comprising producing a single composite photograph using the photographed images.

12. The mobile terminal of claim 2, wherein the shooting area setter receives a demarcation signal from the touch screen in response to a composite shooting request, demarcates a target scene into shooting areas on the basis of the demarcation signal, and draws a line of demarcation between the shooting areas.

13. The mobile terminal of claim 2, wherein the composite shooting section sequentially photographs the shooting areas and produces a single composite photograph using the photographs of the shooting areas.

14. The mobile terminal of claim 2, wherein the shooting sequence setter sends the shooting sequence to the composite shooting section.

15. The composite photographing method of claim 3, further comprising ignoring the touch event signal if the touch event signal is not the valid demarcation signal.

16. The composite photographing method of claim 3, wherein the valid demarcation signal is a line or a geometrical figure.

\* \* \* \* \*